J. M. DODGE.
SPROCKET WHEEL.
APPLICATION FILED OCT. 15, 1909.
954,941.
Patented Apr. 12, 1910.
Fig. 1.
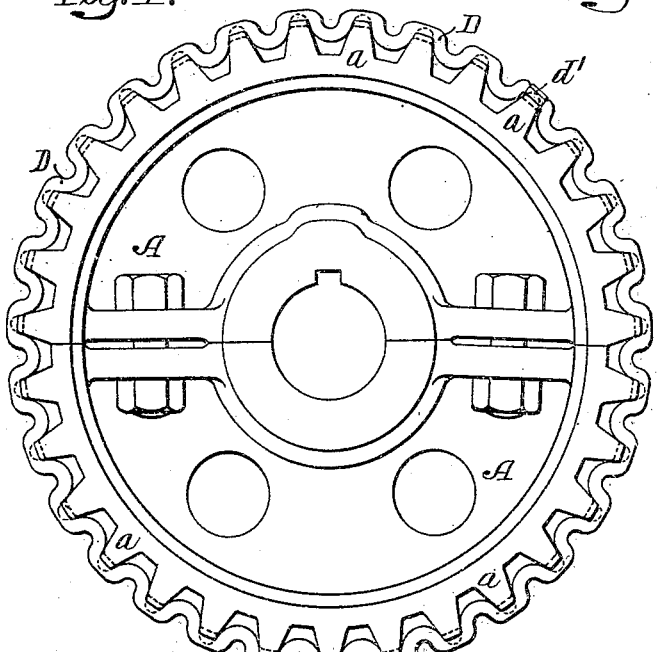
Fig. 2.
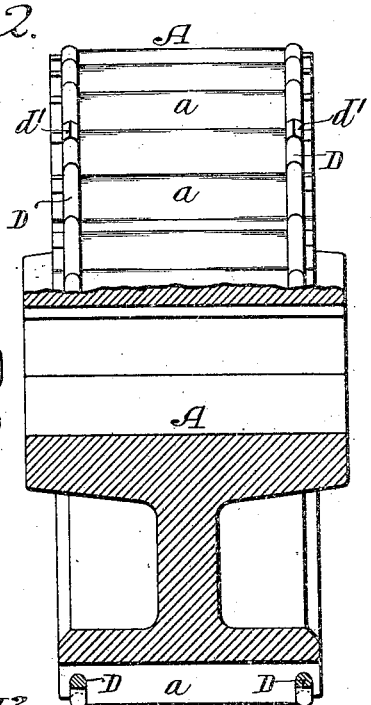
Fig. 3.
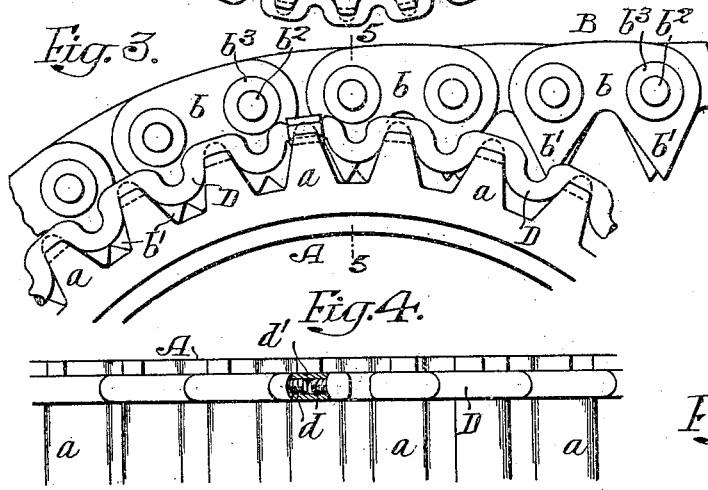
Fig. 5.
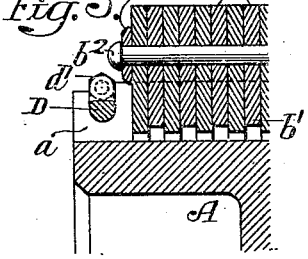
Fig. 4.
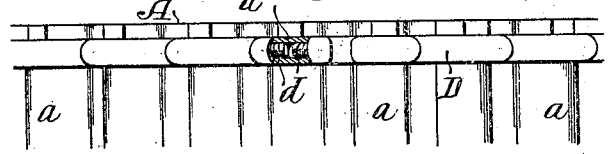
Fig. 6.
Fig. 7.
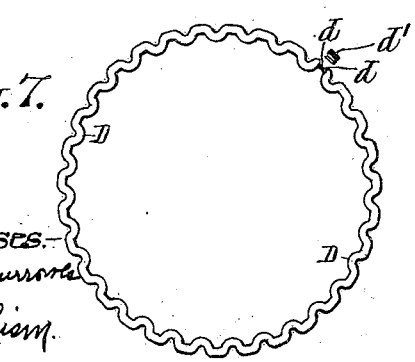
Fig. 8.
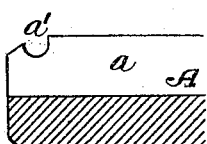
Witnesses.
Willa A. Burrows
Walter Chism
Inventor.—
James M. Dodge.
by his Attorneys.

UNITED STATES PATENT OFFICE.

JAMES MAPES DODGE, OF PHILADELPHIA, PENNSYLVANIA, ASSIGNOR TO LINK-BELT COMPANY, OF CHICAGO, ILLINOIS, A CORPORATION OF ILLINOIS.

SPROCKET-WHEEL.

954,941.  Specification of Letters Patent.  Patented Apr. 12, 1910.

Application filed October 15, 1909.  Serial No. 522,889.

*To all whom it may concern:*

Be it known that I, JAMES M. DODGE, a citizen of the United States, residing in Philadelphia, Pennsylvania, have invented certain Improvements in Sprocket-Wheels, of which the following is a specification.

My invention relates to certain improvements in sprocket wheels adapted for drive chains having teeth which engage the teeth of the wheel.

The main object of my invention is to provide flanges for the wheel which will prevent the chain slipping off the wheel.

A further object of the invention is to provide a detachable flange and one that will not interfere with the washers or pins at each side of the chain, and which will allow the chain to fit snugly between the flanges.

These objects I attain in the following manner, reference being had to the accompanying drawing, in which:—

Figure 1, is a side view of a sprocket wheel illustrating my invention; Fig. 2, is a side view partly in section; Fig. 3, is an enlarged view of a portion of the sprocket wheel, showing the chain in position; Fig. 4, is a plan view of a portion of the wheel; Fig. 5, is a sectional view of a portion of the wheel on the line 5—5, Fig. 3; Fig. 6, is a view similar to Fig. 5, with the chain and hoop removed; Fig. 7, is a detached view of the hoop; and Fig. 8, is a view of a modification.

A is a sprocket wheel having teeth $a$ adapted to receive a chain B. This chain is made up of a series of links $b$ having teeth $b'$ which enter the spaces between the teeth $a$ of the sprocket wheel.

$b^2$, $b^2$ are the pivot pins and $b^3$, $b^3$ are washers which are placed on the outside of the links, as clearly shown in Figs. 3 and 6. Thus the series of links $b$ are held together by fastening the ends of the pivot pins.

Each end of each tooth of the sprocket wheel is grooved at $a'$ to receive a hoop D. The portion $a^2$ of the tooth beyond the groove is less in height than the body of the tooth, so that the hoop can be sprung into place. The hoop D is made of wire and is corrugated, as shown in Figs. 4 and 7; the corrugations being shaped to conform to the shape of the particular sprocket wheel to which it is applied. The two ends of the wire forming the hoop are, in the present instance, threaded as at $d$, $d$ and these two ends are united by a turn buckle $d'$ in the present instance, although they may be welded together or fastened by any other suitable device. The ends of the wire, in the present instance, are reduced and the diameter of the turn buckle is preferably the same diameter as the wire, so that it will not project beyond the inner line of the wire flange, and, therefore, will not interfere with the free running of the chain on the wheel.

By the above construction I provide a flange which will have the least amount of frictional surface and which will retain the chain properly in position on the wheel.

I preferably corrugate the hoop before it is applied to the wheel, as shown in Fig. 7, but the hoop may in some instances be corrugated after it is applied to the wheel; the two ends of the hoop being connected together by welding or other suitable fastenings, and then the hoop is placed in position on the wheel and corrugated by any suitable device. And while I preferably make the wire hoop round in cross section, it may be of any shape desired without departing from the essential features of the invention. The hoop may be made in one or more sections, according to the diameter of the sprocket wheel, and if the sprocket wheel is made in two sections, as illustrated in Fig. 1, the hoop may be made in two sections, but I prefer to make it in one section with a turn buckle securing the two ends together, as illustrated in the drawing. I prefer to so corrugate the hoop that the corrugations do not extend to the base of the teeth when applied to the wheel, so that there is a clearance space under the hoop to allow for the free escape of any dirt which may accumulate on the face of the wheel. By making the hoop D corrugated prior to its application to the wheel it is given a certain amount of elasticity which will allow it to yield when it is forced over the ends of the teeth of the wheel; the hoop contracting when it is sprung into place in the channel $a'$. In some instances, as shown in Fig. 8, the portion of each tooth beyond the channel may be beveled.

I claim:—

1. The combination of a wheel having teeth on its periphery, and a guard clamped on the teeth, said guard being depressed between successive teeth.

2. The combination of a wheel having teeth on its periphery, and a guard clamped upon the teeth near each edge, said guards being depressed between the teeth.

3. The combination of a wheel having teeth on its periphery, the teeth being channeled near each end, forming annular grooves, with a hoop adapted to each channel and depressed between the teeth.

4. The combination in a sprocket wheel, of a body portion having teeth, the teeth being channeled near each end, forming annular grooves, that portion of each tooth outside the channel being less in height than the main body of the wheel, with a corrugated hoop adapted to the channel, said hoop being less in diameter than the wheel, so that when it is forced onto the wheel it will expand and then spring into place.

5. The combination of a sprocket wheel having teeth on its periphery, said teeth being channeled near each end forming annular grooves, with a corrugated hoop mounted at each side of the wheel and resting in the channels of the teeth, with a toothed chain arranged to engage the teeth of the sprocket wheel, said chain having washers at each side, the corrugations in the hoops being such that the washers will extend into the corrugations as the chain passes around the wheel.

6. The combination of a toothed wheel, with a corrugated guard hoop mounted thereon.

In testimony whereof, I have signed my name to this specification, in the presence of two subscribing witnesses.

JAMES MAPES DODGE.

Witnesses:
Wm. E. Shupe,
Wm. A. Barr.